United States Patent
Fujino et al.

(10) Patent No.: US 12,537,224 B2
(45) Date of Patent: Jan. 27, 2026

(54) BATTERY, BATTERY EXTERIOR, AND MEASUREMENT METHOD

(71) Applicant: Panasonic Intellectual Property Management Co., Ltd., Osaka (JP)

(72) Inventors: Makoto Fujino, Osaka (JP); Kazuya Iwamoto, Osaka (JP); Noriyuki Uchida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 562 days.

(21) Appl. No.: 18/055,299

(22) Filed: Nov. 14, 2022

(65) Prior Publication Data

US 2023/0071177 A1 Mar. 9, 2023

Related U.S. Application Data

(63) Continuation of application No. PCT/JP2021/017028, filed on Apr. 28, 2021.

(30) Foreign Application Priority Data

May 27, 2020 (JP) ................................ 2020-092279

(51) Int. Cl.
*H01M 10/0562* (2010.01)
*H01M 4/04* (2006.01)
*H01M 10/0525* (2010.01)

(52) U.S. Cl.
CPC ..... *H01M 10/0562* (2013.01); *H01M 4/0407* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2023/0261347 A1* | 8/2023 | Dugas | H01M 10/0585 429/322 |
| 2023/0307715 A1* | 9/2023 | Kobayashi | H01M 10/0562 |
| 2024/0063518 A1* | 2/2024 | Fujino | H01M 50/121 |
| 2024/0204376 A1* | 6/2024 | Fujino | H01M 10/0562 |
| 2024/0283042 A1* | 8/2024 | Watabe | H01M 10/44 |

FOREIGN PATENT DOCUMENTS

JP 2013-020915 1/2013

OTHER PUBLICATIONS

International Search Report of PCT application No. PCT/JP2021/017028 dated Jun. 8, 2021.

* cited by examiner

*Primary Examiner* — Kevin M Bernatz
(74) *Attorney, Agent, or Firm* — Greenblum & Bernstein, P.L.C.

(57) ABSTRACT

A battery includes: a power generating element including a first electrode layer, a second electrode layer, and a first solid electrolyte layer located between the first electrode layer and the second electrode layer; and a reference electrode section including a second solid electrolyte layer having a first main surface in contact with a side surface of the power generating element and a second main surface opposite to the first main surface, and a reference electrode in contact with the second main surface of the second solid electrolyte layer, in which a length of the first main surface is longer than a length of the side surface in a laminating direction in the power generating element.

14 Claims, 9 Drawing Sheets

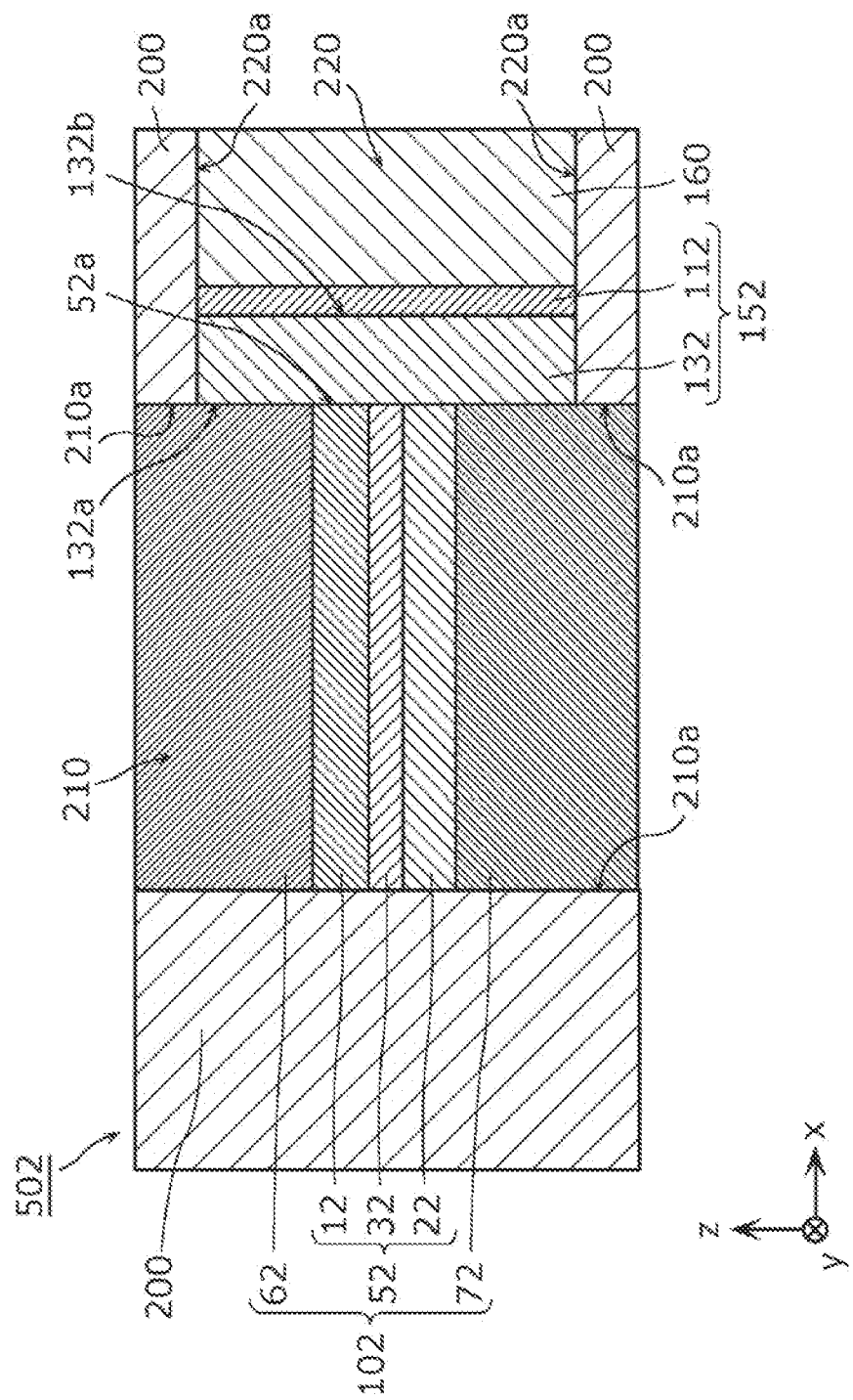

BATTERY, BATTERY EXTERIOR, AND MEASUREMENT METHOD

BACKGROUND

1. Technical Field

The present disclosure relates to a battery, a battery exterior, and a measurement method.

2. Description of the Related Art

A solid-state battery that uses a flame-retardant solid electrolyte instead of a liquid electrolyte containing a flammable organic solvent for use in a battery in the related art such as a non-aqueous electrolyte type lithium-ion secondary battery holds high superiority in basic performance for safety. Thus, having high potential in terms of cost and energy density, such as simplification of a safety device in product development, the solid-state battery is seen as a promising next-generation battery and development competition thereof is accelerating.

However, in order to put solid-state batteries into practical use and further improve their performance, further development is required for active materials capable of achieving high capacity and high output, high-conductivity solid electrolytes, optimum design, process construction, and the like. To this end, it is very important to accurately grasp the battery characteristics in development of various materials, design using combinations of them, and manufacturing process study. In particular, being able to measure electrical characteristics such as a potential of a positive electrode and/or a negative electrode is extremely useful in advancing the research and development effectively and efficiently. Furthermore, if electrical characteristics such as a potential of each of electrodes including the positive electrode, the negative electrode, and the like during operation can be measured during actual use of a battery, it is possible to perform appropriate battery control based on the measured values, and also possible to improve the performance, for example, such as safety and cycling performance.

As a method for investigating the potential and electrochemical behavior of each single electrode, known is a three-electrode measurement method using a reference electrode. For example, "Q & A de Rikaisuru Denkikagaku no Sokutei Houhou (Understanding of Electrochemical Measurement Method with Q & A)" edited by The Electrochemical Society of Japan, published by Mimizuku-sha on December 2009, p. 10 (hereinafter referred to as Non Patent Literature 1) describes battery configurations of solid-state batteries having various structures in which the three-electrode measurement is possible. In addition, Japanese Unexamined Patent Application Publication No. 2013-20915 (hereinafter referred to as Patent Literature 1) discloses a solid-state battery in which a positive electrode current collector, a positive electrode, a solid electrolyte layer, a negative electrode, and a negative electrode current collector are laminated and a third electrode is provided as a reference electrode in contact with a solid electrolyte portion provided being connected with the same width as the length of the side surface of the solid electrolyte layer or the length of the side surfaces of the positive electrode, the solid electrolyte layer, and the negative electrode.

SUMMARY

However, regarding the battery configurations in the related art for performing three-electrode measurement in solid-state batteries, the structures of the batteries are complicated and the formation of the reference electrode requires precise work. For these reasons, it is difficult to form a solid-state battery for performing three-electrode measurement.

One non-limiting and exemplary embodiment provides a battery and the like in which an electrical characteristic of each electrode can be easily measured.

In one general aspect, the techniques disclosed here feature a battery according to one aspect of the present disclosure includes: a power generating element including a first electrode layer, a second electrode layer, and a first solid electrolyte layer located between the first electrode layer and the second electrode layer; and a reference electrode section including a second solid electrolyte layer having a first main surface in contact with a side surface of the power generating element and a second main surface opposite to the first main surface, and a reference electrode in contact with the second main surface of the second solid electrolyte layer, in which a length of the first main surface is longer than a length of the side surface in a laminating direction in the power generating element.

According to the present disclosure, an electrical characteristic of each electrode can be measured easily.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4B is a sectional view illustrating the schematic configuration of the battery according to Embodiment 2;

DETAILED DESCRIPTIONS

Outline of Present Disclosure

Figure 1:
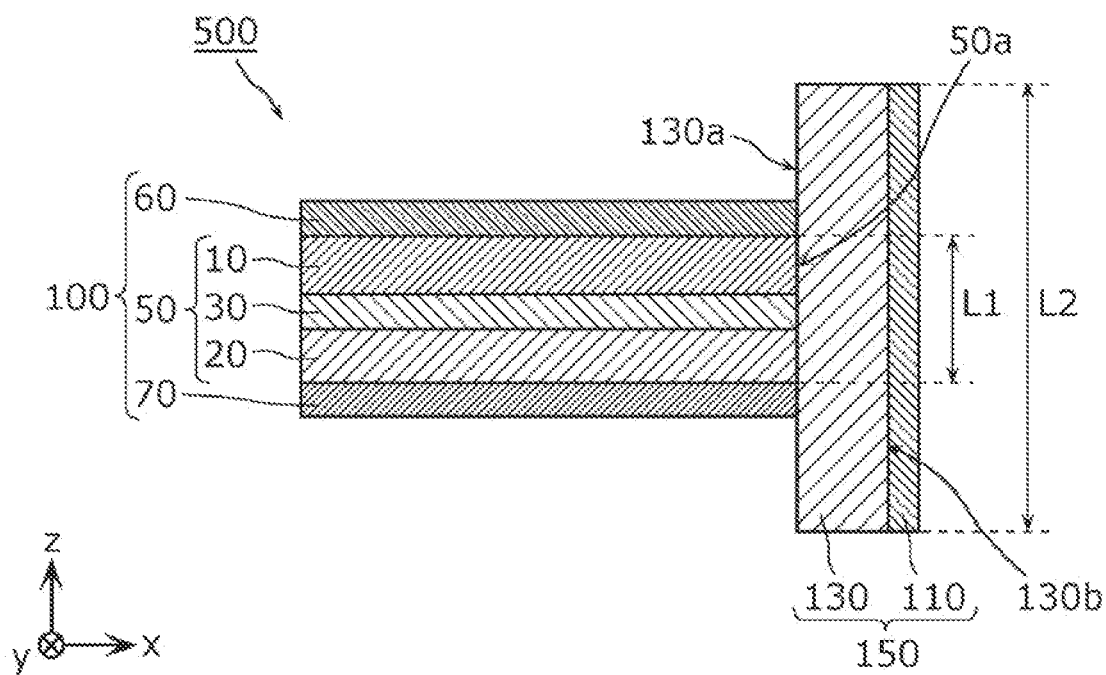
FIG. 1 is a sectional view illustrating a schematic configuration of a battery according to Embodiment 1.

The outline of one aspect of the present disclosure is as follows.

A battery according to one aspect of the present disclosure includes: a power generating element including a first electrode layer, a second electrode layer, and a first solid electrolyte layer located between the first electrode layer and the second electrode layer; and a reference electrode section including a second solid electrolyte layer having a first main surface in contact with a side surface of the power generating element and a second main surface opposite to the first main surface, and a reference electrode in contact with the second main surface of the second solid electrolyte layer, in which a length of the first main surface is longer than a length of the side surface in a laminating direction in the power generating element.

In this structure, the reference electrode section can be produced with such dimensional accuracy that the length of the first main surface just has to be greater than the length of the side surface so as to easily bring the side surface into contact with the first main surface in production of the reference electrode section. Hence, it is possible to easily produce a battery which includes a reference electrode and in which an electrical characteristic such as a potential of each electrode of the battery can be measured. Therefore, according to the present aspect, an electrical characteristic of each electrode can be measured easily.

Moreover, for example, the first solid electrolyte layer and the second solid electrolyte layer may have lithium-ion conductivity.

This makes it possible to easily measure an electrical characteristic of each electrode in a lithium-ion battery.

In addition, for example, the reference electrode may contain at least one of metallic lithium, a lithium alloy, or a lithium compound.

Since this structure has a small equilibrium potential variation, the measurement accuracy of an electrical characteristic of each electrode can be improved.

Moreover, for example, the battery may include a plurality of power generating elements laminated, each of which being the power generating element included in the battery.

With this structure, even in a multilayer type battery, an electrical characteristic of each electrode can be easily measured.

In addition, for example, the first main surface may be in contact with the plurality of power generating elements.

With this structure, an electrical characteristic of each electrode in each of the plurality of power generating elements can be measured. Further, since the first main surface is in contact with the plurality of power generating elements, the area where the reference electrode section is in contact with the power generating elements can be increased, so that the mechanical strength of the battery can be improved.

In addition, for example, the battery may further include an exterior covering the power generating element and the reference electrode section.

In this structure, the power generating element and the reference electrode section are protected and held by the exterior and deterioration, damage, and the like of the battery are suppressed, so that an electrical characteristic of each electrode can be measured stably.

Moreover, for example, the exterior may have a first cavity extending in a first direction and a second cavity extending in a second direction crossing the first direction and communicating with the first cavity, the power generating element may be in contact with an inner surface of the exterior forming the first cavity, and the reference electrode section may be in contact with an inner surface of the exterior forming the second cavity.

With this structure, the power generating element and the reference electrode section are held by the exterior even when expanding and contracting during charging and discharging. Further, since the power generating element and the reference electrode section are easily kept pressurized by the exterior, the measurement accuracy of an electrical characteristic of each electrode in the battery can be improved.

Then, for example, at least one of the first cavity or the second cavity may have a cylindrical shape.

This structure allows easy formation of the first cavity and the second cavity. In addition, this structure is capable of uniformly dispersing a pressure applied for forming the power generating element and the reference electrode section in the first cavity and the second cavity and a stress due to expansion and contraction of the power generating element and the reference electrode section during charging and discharging, therefore making the exterior less likely to be damaged even under a higher pressure or stress, and enabling stable measurement of an electrical characteristic of each electrode.

Moreover, for example, a portion of the exterior in contact with the power generating element and the reference electrode section may contain a resin material.

Thus, since the resin material has good workability, it is possible to easily form an exterior in a shape suited to the shapes of the power generating element and the reference electrode section.

In addition, for example, the exterior may have a first exterior section in contact with the power generating element and the reference electrode section and a second exterior section located outside the first exterior section, and a strength of the second exterior section may be higher than a strength of the first exterior section.

Even when a high pressure is applied to the power generating element, this structure suppresses deformation and damage of the first exterior section and therefore enables the power generating element to be formed appropriately. In addition, the power generating element can be kept pressurized even at a higher pressure. This makes it possible to stably measure an electrical characteristic of each electrode in the battery.

Meanwhile, for example, the second exterior section may contain a metal material.

Thus, the second exterior section having a higher strength can be easily formed.

A current line may further be provided between the reference electrode and at least one of the first electrode layer or the second electrode layer.

With this structure, the positive or negative electrode is electrically connected to the reference electrode, which enables charging and discharging.

There, lithium ions are intercalated and deintercalated between the positive or negative electrode and the reference electrode, so that characteristics of the battery can be improved. For example, it is possible to perform an operation such as controlling the charge-discharge capacity, changing the rate-determining conditions of the positive and negative electrodes, changing the irreversible capacity, or improving the cycling performance.

In addition, since this operation can be performed dynamically even after the battery is built or while the battery is being used as a power source, it is possible to perform more appropriate control for improving the characteristics according to conditions of the built battery or the operating battery.

Then, a battery exterior according to one aspect of the present disclosure is the exterior described above.

The battery exterior described above allows formation of the power generating element and the reference electrode section therein, and is capable of protecting and holding the power generating element and the reference electrode section formed.

A measurement method according to one aspect of the present disclosure is a method for measuring an electrical characteristic of a battery including a power generating element including a first electrode layer, a second electrode layer, and a first solid electrolyte layer located between the first electrode layer and the second electrode layer, the method including: preparing a reference electrode section including a second solid electrolyte layer having a first main surface in contact with a side surface of the power generating element and a second main surface opposite to the first main surface, and a reference electrode in contact with the second main surface of the second solid electrolyte layer; bringing the first main surface of the second solid electrolyte layer into contact with the side surface of the power generating element; and measuring an electrical characteristic between the reference electrode and at least one of the first electrode layer or the second electrode layer, in which a length of the first main surface is longer than a length of the side surface in a laminating direction in the power generating element.

In this method, the reference electrode section can be easily prepared because the reference electrode section can be produced with such dimensional accuracy that the length of the first main surface just has to be greater than the length of the side surface so as to easily bring the side surface into contact with the first main surface in production of the reference electrode section. This easily makes it possible to stably measure an electrical characteristic of each electrode in the battery.

Hereinafter, embodiments will be described specifically in reference to the accompanying drawings.

Each of the embodiments described below presents a comprehensive or specific example. The numeric values, shapes, materials, constituent elements, a layout and a connection form of the constituent elements, manufacturing processes, the order of the manufacturing processes, and so on described in the following embodiments are just examples and are not intended to limit the present disclosure. Among the constituent elements in the following embodiments, the constituent elements not specified in independent claims are described as optional constituent elements.

The drawings are schematic ones and are not necessarily illustrated exactly. Therefore, for example, the scales and the like are not always consistent among the drawings. Moreover, in the drawings, substantially the same constituent elements are assigned with the same reference sign and the repetitive description will be omitted or simplified.

In the present description, terms indicating relationships between elements such as parallel and orthogonal, terms indicating the shapes of elements such as a rectangular shape and a circular shape, and numerical ranges are not expressions specifying strict meanings only, but are expressions meaning substantially the equivalent ranges, for example, including a difference by about several percent.

In the present description and drawings, an x axis, a y axis, and a z axis represent three axes in a three-dimensional Cartesian coordinate system. In the embodiments, a z-axis direction is used as a laminating direction that is a direction perpendicular to a main surface of a power generating element. A positive z-axis direction is regarded as an upper side in the z-axis direction, whereas a negative z-axis direction is regarded as a lower side in the z-axis direction. In the present description, "plan view" means a view of a battery seen along the z axis. In the present description, "thickness" means a length in a direction perpendicular to the main surface of each layer.

In the present description, the meanings of "inner" and "outer" in "an inner side" and "an outer side" are such that "inner" means a direction closer to the center of the battery and "outer" means a direction farther from the center of the battery, unless otherwise stated.

In the present description, the terms "upper" and "lower" in the structure of the battery do not refer to an absolutely upper direction (vertically upper side) and an absolutely lower direction (vertically lower side) in a spatial recognition, but are used as terms specified according to a relative positional relationship based on the order of layers in a multi-layer structure. In addition, the terms "upper" and "lower" are also applied to not only a case where two constituent elements are arranged close to each other and in contact with each other, but also a case where two constituent elements are spaced apart from each other and another constituent element is present between the two constituent elements.

Embodiment 1

First, a battery according to Embodiment 1 will be described.

Structure of Battery

First, a structure of a battery according to the present embodiment will be described. FIG. 1 is a sectional view illustrating a schematic configuration of a battery 500 according to the present embodiment.

As illustrated in FIG. 1, the battery 500 includes a solid-state battery section 100 having a power generating element 50 and a reference electrode section 150. The battery 500 is, for example, an all-solid-state battery. The shape of the battery 500 is, for example, a coin type, a laminate type, a cylindrical type, a square type, or the like.

The solid-state battery section 100 includes the power generating element 50, a positive electrode current collector 60, and a negative electrode current collector 70. In the solid-state battery section 100, the positive electrode current collector 60 is laminated on a surface of a positive electrode layer 10 opposite to a first solid electrolyte layer 30 and the negative electrode current collector 70 is laminated on a surface of a negative electrode layer 20 opposite to the first solid electrolyte layer 30. In other words, the solid-state battery section 100 has a structure in which the negative electrode current collector 70, the negative electrode layer 20, the first solid electrolyte layer 30, the positive electrode layer 10, and the positive electrode current collector 60 are laminated in this order. The solid-state battery section 100 has, for example, a cuboid shape, a polygonal columnar shape, a cylindrical shape, or the like.

The power generating element 50 has the positive electrode layer 10, the negative electrode layer 20, and the first solid electrolyte layer 30 located between the positive electrode layer 10 and the negative electrode layer 20. The positive electrode layer 10 is an example of the first electrode layer and the negative electrode layer 20 is an example of the second electrode layer. In the power generating element 50, the negative electrode layer 20, the first solid electrolyte layer 30, and the positive electrode layer 10 are laminated in this order.

The reference electrode section 150 includes a second solid electrolyte layer 130 having a first main surface 130a in contact with a side surface 50a of the power generating element 50 and a second main surface 130b opposite to the first main surface 130a, and a reference electrode 110 in contact with the second main surface 130b.

Hereinafter, detailed description will be given of the constituent elements included in the battery 500.

The power generating element 50 is located between the positive electrode current collector 60 and the negative electrode current collector 70. The side surface 50a of the power generating element 50 is in contact with the reference electrode section 150, more specifically the first main surface 130a of the second solid electrolyte layer 130. The side surface 50a is a surface connecting end portions of the two main surfaces of the power generating element 50 and is a flat surface parallel with a laminating direction in the power generating element 50 in FIG. 1. The side surface 50a may incline with respect to the laminating direction in the power generating element 50. The laminating direction in the power generating element 50 is a direction in which the layers constituting the power generating element 50 are laminated, or more specifically the negative electrode layer 20, the first solid electrolyte layer 30, and the positive electrode layer 10 are laminated one on top of another.

The power generating element 50 has, for example, a cuboid shape, a polygonal columnar shape, a cylindrical shape, or the like.

The positive electrode layer 10 is located between the positive electrode current collector 60 and the first solid electrolyte layer 30, and is in contact with the positive electrode current collector 60 and the first solid electrolyte layer 30. Moreover, a side surface of the positive electrode layer 10 on the reference electrode section 150 side is in contact with the second solid electrolyte layer 130, more specifically the first main surface 130a.

The positive electrode layer 10 contains at least a positive electrode active material. As a material for the positive electrode layer 10 in addition to the positive electrode active material, a positive electrode mixture containing at least one of a solid electrolyte, a conductive aid, or a binder material may be used, if necessary.

As the positive electrode active material, any known material capable of intercalating and deintercalating (inserting and extracting or dissolving and precipitating) metal ions such as lithium ions, sodium ions, magnesium ions, potassium ions, calcium ions, or copper ions may be used.

Examples of the positive electrode active material include transition metal oxides containing lithium, transition metal oxides containing no lithium, transition metal fluorides, polyanionic materials, fluorinated polyanionic materials, transition metal sulfides, transition metal oxyfluorides, transition metal oxysulfides, transition metal oxynitrides, and the like. When a lithium-containing transition metal oxide is used as the positive electrode active material, it is possible to reduce the battery manufacturing cost and also increase the average discharge voltage of the battery.

Examples of a material capable of extracting and inserting lithium ions usable as the positive electrode active material include lithium cobalt composite oxide (LCO), lithium nickel composite oxide (LNO), lithium manganese composite oxide (LMO), lithium-manganese-nickel composite oxide (LMNO), lithium-manganese-cobalt composite oxide (LMCO), lithium-nickel-cobalt composite oxide (LNCO), lithium-nickel-manganese-cobalt composite oxide (LNMCO), and the like. Specific examples of the positive electrode active material include $LiCoO_2$, $LiMn_2O_4$, $Li_2NiMn_3O_8$, $LiVO_2$, $LiCrO_2$, $LiFePO_4$, $LiCoPO_4$, $LiNiO_2$, $LiNi_{1/3}Co_{1/3}Mn_{1/3}O_2$, $LiNi_xMn_yAl_zO_2$, $LiNi_xCo_yMn_z$, $LiNi_xCo_yAl_z$, and the like.

As the solid electrolyte, a known material that conducts protons or metal ions such as lithium ions, sodium ions, magnesium ions, potassium ions, calcium ion, copper ions, or silver ions may be used. An example usable as the solid electrolyte is a solid electrolyte material such as a sulfide solid electrolyte, a halogen-based solid electrolyte, an oxide solid electrolyte, or a polymer solid electrolyte.

An example of the sulfide solid electrolyte usable as a material capable of conducting lithium ions is a composite ($Li_2S$—$P_2S_5$) composed of lithium sulfide ($Li_2S$) and diphosphorus pentasulfide ($P_2S_5$). As the sulfide solid electrolyte, there are sulfides such as $Li_2S$—$P_2S_5$, $Li_2S$—$P_2SS$—$LiBH_4$, $Li_7P_3S_{11}$, $Li_2S$—$SiS_2$, $Li_2S$—$SiS_2$—$Li_3PO_4$, $Li_2S$—$SiS_2$—$Li_4SiO_4$, $Li_2S$—$B_2S_3$, $Li_2S$—$GeS_2$, $Li_6PS_5Cl$, $LiSiPSCl$, and a sulfide containing $Li_3N$ or $Li_3N$ (H). As the sulfide solid electrolyte, any of the above sulfides to which at least one of $Li_3N$, $LiCl$, $LiBr$, $LiI$, $Li_3PO_4$, or $Li_4SiO_4$ is added as an additive may be used. Moreover, other specific sulfide solid electrolytes are $Li_{10}GeP_2SI_2$ (LGPS), $Na_3Zr_2(SiO_4)_2PO_4$ (NASICON), and the like.

An example of the oxide solid electrolyte usable as a material capable of conducting lithium ions is $Li_7La_3Zr_2O_{12}$ (LLZ), $Li_{1.3}Al_{0.3}Ti_{1.7}(PO_4)_3$(LATP), $(La,Li)TiO_3$ (LLTO), or the like.

The halogen-based solid electrolyte is a solid electrolyte containing a halide. The halide is a compound composed of, for example, Li, M', and X', M' is at least one element selected from the group consisting of metal elements other than Li and metalloid elements. X' is at least one element selected from the group consisting of F, Cl, Br, and I. The "metal elements" are all the elements contained in groups 1 to 12 of the periodic table (but excluding hydrogen), and all the elements contained in groups 13 to 16 of the periodic table (but excluding B, Si, Ge, As, Sb, Te, C, N, P, O, S, and Se). The "metalloid elements" are B, Si, Ge, As, Sb, and Te. For example, M' may include Y (yttrium). Halides containing Y are $Li_3YCl_6$ and $Li_3YBr_6$.

Examples of other halides include $Li_2MgX'_4$, $Li_2FeX'_4$, $Li(Al,Ga,In)X'_4$, $Li_3(Al,Ga,In)X'_6$, $LiOX$, and $LiX$. Specific examples of halides include $Li_3InBr_6$, $Li_3InCl_6$, $Li_2FeCl_4$, $Li_2CrCl_4$, $Li_3OCl$, and $LiI$.

The polymer solid electrolyte is not particularly limited and may be any solid electrolyte containing a polymer material having ion-conductivity. Examples of the polymer material having ion-conductivity include polyethers, polyether-derivatives, polyesters, polyimines, and the like.

As the solid electrolyte, a solid electrolyte material in a thin film form such as lithium phosphorus oxynitride (LIPON) may be used, other than the above solid electrolyte materials.

In the positive electrode layer 10, a volume ratio of the positive electrode active material to the total volume of the positive electrode active material and the solid electrolyte is, for example, greater than or equal to 30% and less than or equal to 95%. Then, a volume ratio of the solid electrolyte to the total volume of the positive electrode active material and the solid electrolyte is, for example, greater than or equal to 5% and less than or equal to 70%. When the amount of the positive electrode active material and the amount of the solid electrolyte are in the above volume ratios, a sufficient energy density of the battery 500 can be easily ensured and the battery 500 can be easily operated with high output.

As the binder material, any of the same materials as materials for used in general solid-state batteries may be used. Examples of the binder material include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoro polypropylene, styrene butadiene rubber, carboxymethyl cellulose, polyaniline, polythiophene styrene butadiene rubber, polyacrylate, and the like. Instead, as the binder material, it is possible to use a copolymer of two or more materials selected from tetrafluoroethylene, hexafluoro ethylene, hexafluoro propylene, perfluoroalkyl vinylether, vinylidene fluoride, chlorotrifluoroethylene, ethylene, propylene, pentafluoro propylene, fluoromethyl vinyl ether, acrylic acid, and hexadiene.

Examples of the conductive aid include graphite such as natural graphite and artificial graphite, carbon black such as acetylene black, furnace black, and Ketjen black (registered trademark), conductive fibers such as VGCF, carbon nanotubes, carbon nanofibers, fullerene, carbon fiber, and metal fiber, metal powders such as carbon fluoride and aluminum powders, conductive whiskers such as zinc oxide whiskers and potassium titanate whiskers, conductive metal oxides such as titanium oxide, conductive polymer compounds such as polyaniline, polypyrrole, and polythiophene, and the like.

The conductive aid is in, for example, a needle form, a scaly form, a spherical form, or an elliptical spherical form. The conductive aid may be particles.

The thickness of the positive electrode layer 10 is, for example, greater than or equal to 10 μm and less than or equal to 500 μm. When the thickness of the positive electrode layer 10 is within the above range, a sufficient energy density of the battery 500 can be easily ensured, and the battery 500 can be easily operated with high output.

An example of a method for forming the positive electrode layer 10 is a method of uniaxial pressing of a powdered positive electrode mixture or the like. Instead, a paste-like paint in which a positive electrode mixture and a solvent are kneaded may be applied onto a substrate, the first solid electrolyte layer 30, the positive electrode current collector 60, or the like, and then dried to produce the positive electrode layer 10.

The negative electrode layer 20 is located between the negative electrode current collector 70 and the first solid electrolyte layer 30 and is in contact with the negative electrode current collector 70 and the first solid electrolyte layer 30. Then, a side surface of the negative electrode layer 20 on the reference electrode section 150 side is in contact with the second solid electrolyte layer 130, more specifically the first main surface 130*a*.

The negative electrode layer 20 contains at least a negative electrode active material. As a material for the negative electrode layer 20 in addition to the negative electrode active material, a negative electrode mixture containing at least one of a solid electrolyte, a conductive aid, or a binder material may be used, if necessary.

As the negative electrode active material, any known material capable of intercalating and deintercalating (inserting and extracting or dissolving and precipitating) metal ions such as lithium ions, sodium ions, magnesium ions, potassium ions, calcium ions, or copper ions may be used. As the negative electrode active material, there are metal materials, carbon materials, oxides, nitrides, tin compounds, silicon compounds, and the like.

An example of a material capable of extracting and inserting lithium ions usable as the negative electrode active material is a carbon material such as natural graphite, artificial graphite, graphite carbon fiber, or heat-treated resin carbon, metallic lithium, a lithium alloy, an oxide of lithium and transition metal elements, or the like. Metals usable for the lithium alloy include indium, aluminum, silicon, germanium, tin, zinc, and the like. Specific ones as the oxide of lithium and transition metal elements are $Li_4Ti_5O_{12}$, $Li_xSiO$, and the like.

For the solid electrolyte of the negative electrode layer 20, the foregoing solid electrolyte materials may be used. In addition, for the conductive aid of the negative electrode layer 20, the foregoing conductive aids may be used. Moreover, as the binder material of the negative electrode layer 20, the foregoing binder materials may be used.

In the negative electrode layer 20, a volume ratio of the negative electrode active material to the total volume of the negative electrode active material and the solid electrolyte is, for example, greater than or equal to 30% and less than or equal to 95%. Then, a volume ratio of the solid electrolyte to the total volume of the negative electrode active material and the solid electrolyte is, for example, greater than or equal to 5% and less than or equal to 70%. When the amount of the negative electrode active material and the amount of the solid electrolyte are in the above volume ratios, a sufficient energy density of the battery 500 can be ensured, and the battery 500 can be easily operated with high output.

The thickness of the negative electrode layer 20 is, for example, greater than or equal to 10 μm and less than or equal to 500 μm. When the thickness of the negative electrode layer 20 is within the above range, a sufficient energy density of the battery 500 can be easily ensured, and the battery 500 can be easily operated with high output.

An example of a method for forming the negative electrode layer 20 is a method of uniaxial pressing of a powdered negative electrode mixture or the like. Instead, a paste-like paint in which a negative electrode mixture and a solvent are kneaded may be applied onto a substrate, the first solid electrolyte layer 30, the negative electrode current collector 70, or the like, and then dried to produce the negative electrode layer 20.

The first solid electrolyte layer 30 is located between the positive electrode layer and the negative electrode layer 20 and is in contact with the positive electrode layer 10 and the negative electrode layer 20. Then, a side surface of the first solid electrolyte layer on the reference electrode section 150 side is in contact with the second solid electrolyte layer 130, more specifically the first main surface 130*a*.

The first solid electrolyte layer 30 has conductivity of metal ions such as lithium ions, sodium ions, magnesium ions, potassium ions, calcium ions, or copper ions. The first solid electrolyte layer 30 may have lithium-ion conductivity.

The first solid electrolyte layer 30 contains at least a solid electrolyte, and may contain a binder material if necessary.

The first solid electrolyte layer 30 may contain a solid electrolyte having lithium-ion conductivity.

For the solid electrolyte of the first solid electrolyte layer 30, the foregoing solid electrolyte materials may be used. For the first solid electrolyte layer 30, one solid electrolyte may be used or two or more solid electrolytes may be used. Moreover, as the binder material of the first solid electrolyte layer 30, the foregoing binder materials may be used.

The thickness of the first solid electrolyte layer 30 is, for example, greater than or equal to 0.1 μm and less than or equal to 1000 μm. From the viewpoint that the energy density of the battery 500 can be improved, the thickness of the first solid electrolyte layer may be greater than or equal to 0.1 μm and less than or equal to 50 μm.

An example of a method for forming the first solid electrolyte layer 30 is a method of uniaxial pressing of a powdered material containing the first solid electrolyte layer 30, or the like. Instead, a paste-like paint in which a material containing the first solid electrolyte layer 30 and a solvent are kneaded may be applied onto a substrate, the positive electrode layer 10, the negative electrode layer 20, or the like, and then dried to produce the first solid electrolyte layer 30.

The side surface of the positive electrode layer 10, the side surface of the negative electrode layer 20, and the side surface of the first solid electrolyte layer 30 are flush with each other and constitute the side surface 50a. However, the side surface of the positive electrode layer 10, the side surface of the negative electrode layer 20, and the side surface of the first solid electrolyte layer 30 do not have to be flush with each other. For example, the side surfaces of the positive electrode layer 10 and the negative electrode layer 20 may be covered with the first solid electrolyte layer 30 and the side surface of the first solid electrolyte layer 30 may alone constitute the side surface 50a.

The positive electrode current collector 60 is located on top of the positive electrode layer 10 and is in contact with the positive electrode layer 10. The negative electrode current collector 70 is located under the negative electrode layer 20 and is in contact with the negative electrode layer 20. Side surfaces of the positive electrode current collector 60 and the negative electrode current collector 70 are in contact with the first main surface 130a.

A material for the positive electrode current collector 60 and the negative electrode current collector 70 is a metal material having high conductivity such as, for example, copper, aluminum, nickel, iron, stainless steel, platinum, gold, an alloy of two or more of these, or a plated product of any of these. The positive electrode current collector 60 and the negative electrode current collector 70 may be formed of the same material or formed of different materials.

The shapes of the positive electrode current collector 60 and the negative electrode current collector 70 are not particularly limited and may be set depending on the shape of the battery 500 and the like. The positive electrode current collector 60 and the negative electrode current collector 70 have, for example, a rod shape, a plate shape, a sheet shape, a foil shape, a mesh shape, or the like.

The thickness of each of the positive electrode current collector 60 and the negative electrode current collector 70 is, for example, greater than or equal to 1 μm and less than or equal to 10 mm. Instead, the thickness of each of the positive electrode current collector 60 and the negative electrode current collector 70 may be greater than or equal to 10 mm depending on the shape of the battery 500.

The second solid electrolyte layer 130 is located between the reference electrode 110 and the power generating element 50. The second solid electrolyte layer 130 has the first main surface 130a and the second main surface 130b.

The first main surface 130a is in contact with the side surface 50a of the power generating element 50. Specifically, the first main surface 130a is in contact with all the side surfaces on the reference electrode section 150 side of the positive electrode layer 10, the negative electrode layer 20, and the first solid electrolyte layer 30 constituting the power generating element 50. In other words, the first main surface 130a is in contact with a region spanning from one end to the other end of the side surface 50a in the laminating direction (z-axis direction). The first main surface 130a is also further in contact with the positive electrode current collector 60 and the negative electrode current collector 70. In the laminating direction in the power generating element 50, a length L2 of the first main surface 130a is longer than a length L1 of the side surface 50a in contact with the first main surface 130a. The length L1 is a length of a portion of the side surface 50a in contact with the first main surface 130a. Meanwhile, the second main surface 130b is in contact with the reference electrode 110.

As a material for forming the second solid electrolyte layer 130, the same materials as in the first solid electrolyte layer 30 may be used. Here, for the first solid electrolyte layer 30 and the second solid electrolyte layer 130, the same material may be used or different materials may be used. For the second solid electrolyte layer 130, one solid electrolyte may be used or two or more solid electrolytes may be used.

Then, the thickness of the second solid electrolyte layer 130 is, for example, greater than or equal to 10 μm and less than or equal to 10 mm.

The reference electrode 110 is in contact with the second main surface 130b of the second solid electrolyte layer 130. In FIG. 1, the reference electrode 110 is in contact with the entire second main surface 130b. Instead, the reference electrode 110 do not have to be in contact with the entire second main surface 130b, but may be provided to be in contact with a partial region on the second main surface 130b.

As a material for the reference electrode 110, any material that exhibits an equilibrium potential when being in electrochemical contact with the second solid electrolyte layer 130 may be used without particular limitation. The reference electrode 110 contains at least one of, for example, metallic lithium, an lithium alloy, or a lithium compound. From the viewpoint of measurement accuracy, a material having a small equilibrium potential variation may be used as the material for the reference electrode 110. Examples of the material having a small equilibrium potential variation include metallic lithium, lithium alloys such as In—Li and lithium compounds such as $Li_4Ti_5O_{12}$.

Each of the positive electrode layer 10, the negative electrode layer 20, the first solid electrolyte layer 30, the positive electrode current collector 60, the negative electrode current collector 70, the second solid electrolyte layer 130, and the reference electrode 110 has, for example, a circular shape, a rectangular shape, a polygonal shape, or the like in plan view.

As a method for producing the battery 500 according to the present embodiment, the same method as a method for producing a general battery may be used except that the method includes providing the second solid electrolyte layer 130 and the reference electrode 110. For example, first, powders of a material for forming the positive electrode layer 10, a material for forming the first solid electrolyte layer 30, and a material for forming the negative electrode layer 20 are sequentially pressed and compression molded to produce the power generating element 50. Moreover, before or after the power generating element 50 is produced, a material for forming the second solid electrolyte layer 130 is pressed and compression molded to form the second solid electrolyte layer 130. Thereafter, on the second solid electrolyte layer 130 thus formed, for example, the reference electrode 110 is placed or a material for forming the reference electrode 110 is pressed and compression molded to produce the reference electrode section 150. Then, the first main surface 130a of the second solid electrolyte layer 130 is brought into contact with the side surface 50a of the power generating element 50, so that the battery 500 can be produced. Instead, the reference electrode section 150 may be directly formed on the side surface 50a of the power generating element 50.

Method for Measuring Electrical Characteristic of Battery

Next, a method for measuring an electrical characteristic of the battery 500 according to the present embodiment will be described. Specifically, the method for measuring the electrical characteristic of the battery 500 including the power generating element 50 will be described by using FIGS. 2A and 2B.

Figure 2A:
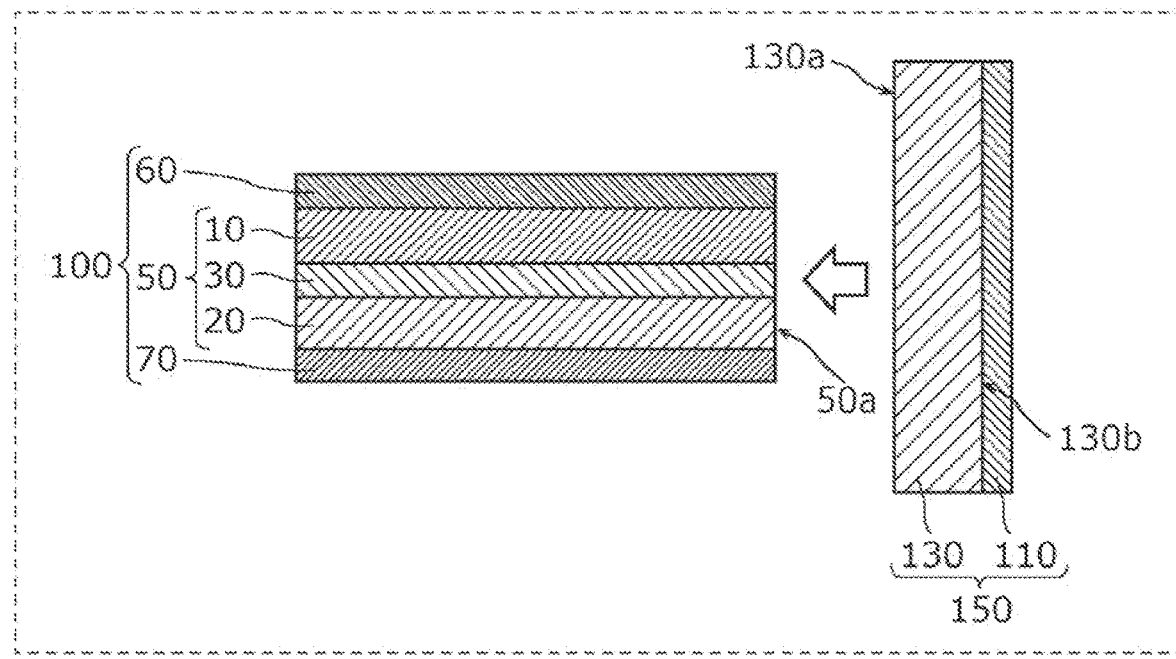
FIG. 2A is a diagram for describing a method for measuring an electrical characteristic of the battery according to Embodiment 1.
Figure 2B:
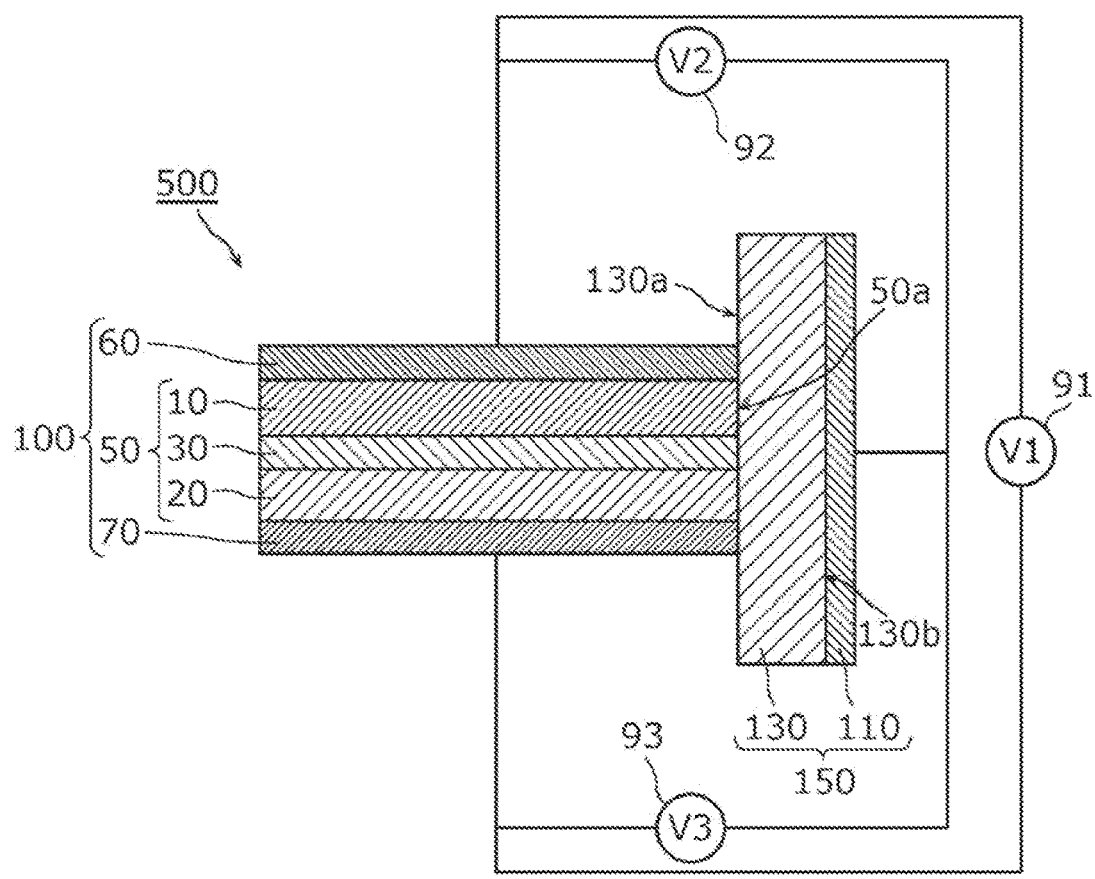
FIG. 2B a diagram for describing the method for measuring the electrical characteristic of the battery according to Embodiment 1.

FIGS. 2A and 2B are diagrams for describing the method for measuring the electrical characteristic of the battery 500.

As illustrated in FIG. 2A, first, the power generating element 50 and the reference electrode section 150 are prepared by using the aforementioned production method or the like. Then, the first main surface 130a of the second solid electrolyte layer 130 is brought into contact with the side surface 50a of the power generating element 50. Thus, the battery 500 is formed as illustrated in FIG. 2B. In the contact state, the length of the first main surface 130a is longer than the length of the side surface 50a in the laminating direction in the power generating element 50 as described above. To be more specific, in the preparation of the reference electrode section 150, the reference electrode section 150 is prepared which includes the second solid electrolyte layer 130 having the first main surface 130a with a length in at least one direction (the length L2 in the present embodiment) longer than the length L1 of the side surface 50a in the laminating direction in the power generating element 50.

Then, for example, as illustrated in FIG. 2B, voltage meters 91, 92, and 93 are electrically connected between the positive electrode layer 10 and the negative electrode layer 20, between the positive electrode layer 10 and the reference electrode 110, and between the negative electrode layer 20 and the reference electrode 110, respectively. This makes it possible to measure a voltage V1 between the positive electrode layer 10 and the negative electrode layer 20, a voltage V2 between the positive electrode layer 10 and the reference electrode 110, and a voltage V3 between the negative electrode layer 20 and the reference electrode 110. In this way, the electrical characteristic such as the voltage between the reference electrode 110 and at least one of the positive electrode layer 10 or the negative electrode layer 20 is measured. Instead, as the electrical characteristic, an electrical characteristic other than the voltage, such as impedance, may be measured.

In this measurement, the reference electrode 110 exhibits a certain value as the equilibrium potential with the second solid electrolyte layer 130 irrespective of operations of the positive electrode layer 10 and the negative electrode layer 20, so that the potential of the positive electrode layer 10 and/or the negative electrode layer 20 can be measured as a potential difference between the reference electrode 110 and the positive electrode layer and/or the negative electrode layer 20.

For the solid-state batteries having the reference electrodes in the related art, various structures have been studied as disclosed in Non Patent Literature 1, but these structures are complicated and are not easy to form.

The solid-state battery having the reference electrode disclosed in Patent Literature 1 has the structure in which the positive electrode, the solid electrolyte layer, and the negative electrode are laminated, and the third electrode is provided as the reference electrode in contact with the solid electrolyte portion provided being connected with the same width as the length of the side surface of the solid electrolyte layer or the length of the side surfaces of the positive electrode, the solid electrolyte layer, and the negative electrode, and therefore is capable of measuring the potential of the positive electrode and/or the negative electrode.

However, it is not easy to form the solid electrolyte portion matching the length of the side surface of the solid electrolyte layer or the length of the side surfaces of the positive electrode, the solid electrolyte layer, and the negative electrode as in the structure described in Patent Literature 1. In addition, a solid-state battery having thin electrodes and a thin solid electrolyte layer is more preferable because the solid-state battery can achieve better characteristics. The solid-state battery thus having the thin layers, however, has a problem that the formation of the solid electrolyte portion is even more difficult.

Meanwhile, in order to operate a solid-state battery formed, the solid-state battery has to be brought into a pressurized state in general. However, it is not easy to pressurize the complicated structures as described in Non Patent Literature 1 and Patent Literature 1 while keeping their functions and measure the characteristics of the batteries and the electrodes.

In the present embodiment, it is found that, for three-electrode measurement, the second solid electrolyte layer 130 in contact with the power generating element 50 does not have to have a structure in which the length of the first main surface 130a exactly matches the side surface 50a in the laminating direction in the power generating element 50, but just has to be brought into electrochemical contact with the power generating element 50. Thus, as illustrated in FIG. 1, the battery 500 has the structure which includes the power generating element 50 and the reference electrode section 150 and in which the length L2 of the first main surface 130a of the second solid electrolyte layer 130 is longer than the length L1 of the side surface 50a of the power generating element 50 in the laminating direction in the power generating element 50. Therefore, the reference electrode section 150 can be produced with such dimensional accuracy that the length L2 of the first main surface 130a just has to be longer than the length L1 of the side surface 50a so as to easily bring the side surface 50a into contact with the first main surface 130a in the production of the reference electrode section 150. Hence, it is possible to easily produce the battery 500 in which the electrical characteristics such as the potentials of the positive electrode layer and the negative electrode layer 20 can be measured. As a result, the electrical characteristic of each electrode can be easily measured by using the battery 500 and the method for measuring the electrical characteristic of the battery 500.

The potential of each of the positive electrode layer 10 and/or the negative electrode layer 20 can be measured easily by using the battery 500 according to the present embodiment. Thus, in the development of batteries, the electrical characteristic of the positive electrode layer 10 and/or the negative electrode layer 20 can be grasped and the electrical characteristics of the positive electrode layer 10 and the negative electrode layer can be measured separately, so that the development and designing of batteries can be promoted efficiently and effectively.

Then, in the case where the battery 500 according to the present embodiment is applied to a battery for practical use, the following effects may be achieved, for example. For example, in the positive electrode layer 10, in the case where the active material at a certain potential or higher changes in its structure and thereby deteriorates the electrode performance, such as a charge-discharge capacity and cycling performance, the potential of the positive electrode layer 10 can be monitored and controlled so as not to reach the certain potential or higher. As a result, deterioration in the electrode performance due to charging in the battery 500 can be prevented. Meanwhile, in the negative electrode layer 20, for example, in the case where the electrode during charging is used up to around a metallic lithium precipitation potential, the potential of the electrode is monitored and controlled so as not to reach the metallic lithium precipitation potential (for example, greater than or equal to 0 V, vs. $Li^+/Li$), so that the metallic lithium precipitation can be prevented. As a result, it is possible to reduce the risks in the battery 500 such as shortening of the battery life along with a decrease in the charge-discharge capacity and cycling deterioration, as well as a short-circuit phenomenon, heating, and ignition associated with the precipitation of metallic lithium.

Embodiment 2

Next, a battery according to Embodiment 2 will be described.

Embodiment 2 is different from Embodiment 1 mainly in that the battery according to Embodiment 2 includes multiple power generating elements laminated. In the following description, different points from Embodiment 1 will be mainly described, and the description of the common points will be omitted or simplified.

Figure 3:
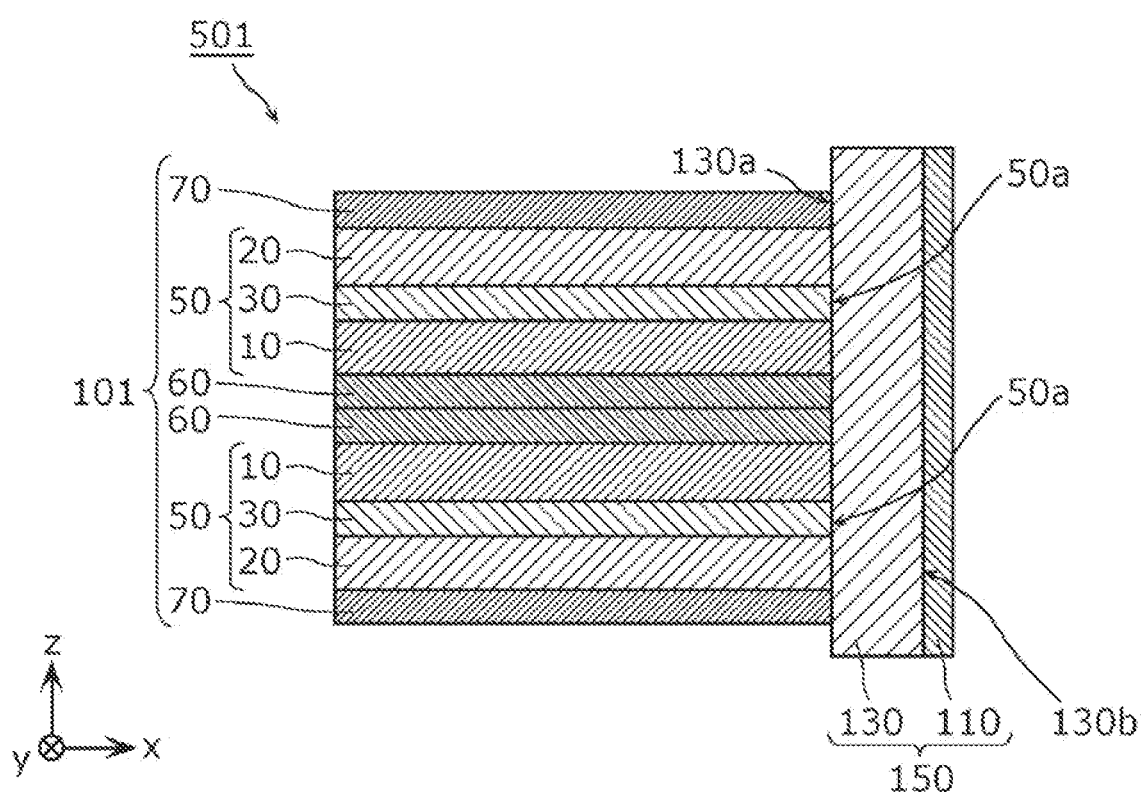
FIG. 3 is a sectional view illustrating a schematic configuration of a battery according to Embodiment 2.

FIG. 3 is a sectional view illustrating a schematic configuration of a battery 501 according to the present embodiment. As compared with the battery 500 according to Embodiment 1, the battery 501 includes a solid-state battery section 101 in place of the solid-state battery section 100.

As illustrated in FIG. 3, the battery 501 according to the present embodiment includes the solid-state battery section 101 including multiple power generating elements 50 laminated and a reference electrode section 150.

The solid-state battery section 101 includes the multiple power generating element 50 laminated in a parallel circuit form with current collectors (positive electrode current collectors 60 in FIG. 3) interposed in between. In addition, the solid-state battery section 101 includes the positive electrode current collectors 60 between the multiple power generating elements 50 and negative electrode current collectors 70 located on the sides of the power generating elements 50 opposite to the respective positive electrode current collector 60 sides. In the solid-state battery section 101, the multiple power generating elements 50 are laminated such that the positive electrode layer 10 of the upper power generating element 50 and the positive electrode layer 10 of the lower power generating element 50 out of the power generating elements 50 neighboring in the laminating direction are in contact with the positive electrode current collectors 60 between the neighboring power generating elements 50. In other words, the solid-state battery section 101 has a structure in which the multiple power generating elements 50 are laminated with their upper and lower directions alternately inverted so that the homopolar electrode layers in the neighboring power generating elements 50 can face each other across the current collectors.

A first main surface 130a of the second solid electrolyte layer 130 is in contact with side surfaces 50a of the respective multiple power generating elements 50. Since the first main surface 130a is in contact with the multiple power generating elements 50 as described above, the area where the reference electrode section 150 is in contact with the power generating elements 50 can be increased to improve the mechanical strength of the battery 501. Although the first main surface 130a is in contact with all the side surfaces 50a of the power generating elements 50 in FIG. 3, the power generating element 50 having the side surface 50a out of contact with the first main surface 130a may be present.

Even in such battery 501, the reference electrode section 150 thus provided makes it possible to measure an electrical characteristic such as an electrode potential of at least one of the multiple positive electrode layers 10 or negative electrode layers 20 laminated in the parallel circuit form and therefore easily and independently measure an electrical characteristic, such as a potential behavior of each of the positive electrode layers 10 and the negative electrode layers 20, as in the case of the battery 500.

Although the power generating elements 50 are laminated such that both surfaces of one positive electrode current collector 60 are in contact with another positive electrode current collector 60 and the positive electrode layer 10 in FIG. 3, each of the power generating elements 50 may have a structure in which the positive electrode layer 10 and the negative electrode layer 20 are reversed. Moreover, although the solid-state battery section 101 includes two power generating elements 50 in FIG. 3, the solid-state battery section 101 may include three or more power generating elements 50 laminated in a parallel circuit form. In the case where the solid-state battery section 101 includes three or more power generating elements 50, the battery 501 may include multiple reference electrode sections 150, and each of the first main surfaces 130a of the multiple reference electrode sections 150 may be in contact with the side surface 50a of at least one power generating element 50 among the three or more power generating elements 50.

Embodiment 3

Next, a battery according to Embodiment 3 will be described.

Embodiment 3 is different from Embodiment 1 mainly in that the battery according to Embodiment 3 further includes an exterior. In the following description, different points from Embodiments 1 and 2 will be mainly described, and the description of the common points will be omitted or simplified.

Figure 4A:
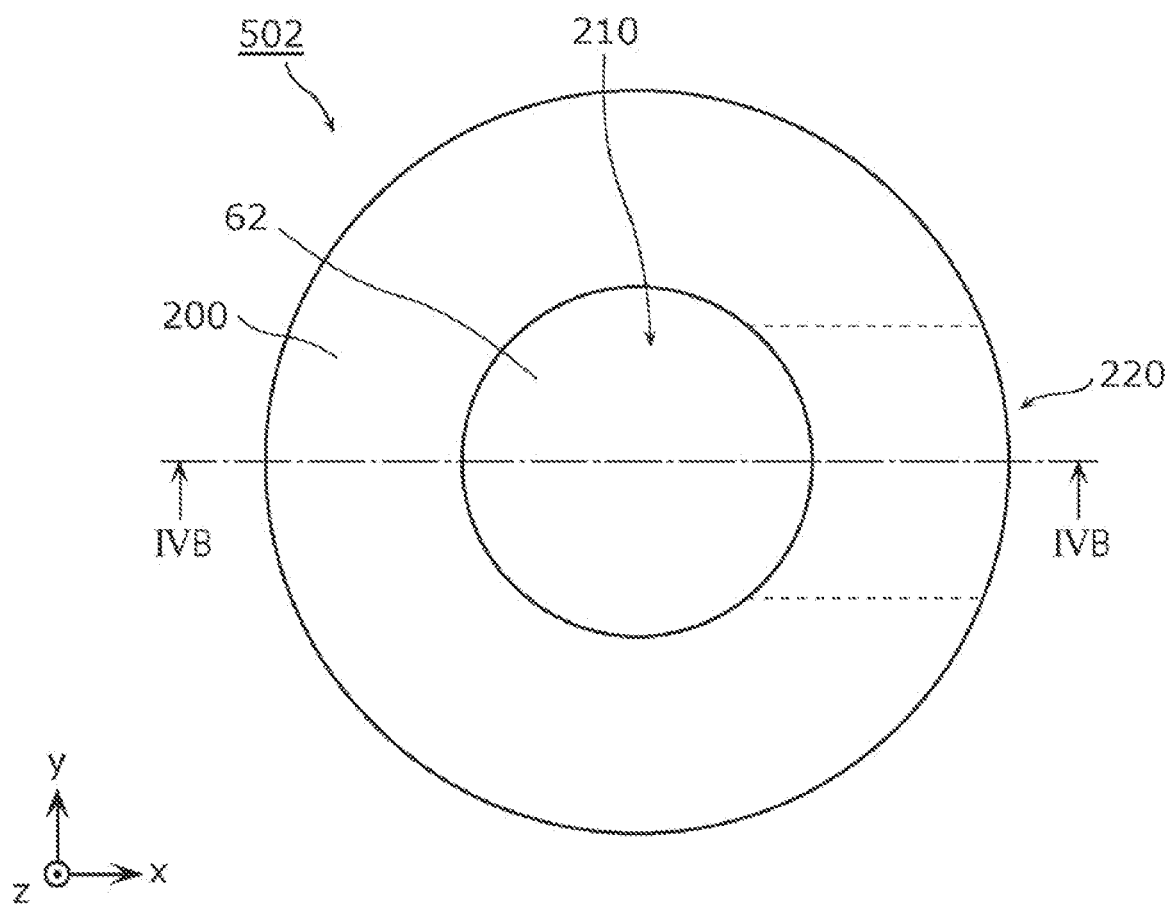
FIG. 4A is a top view illustrating the schematic configuration of the battery according to Embodiment 2.
Figure 4C:
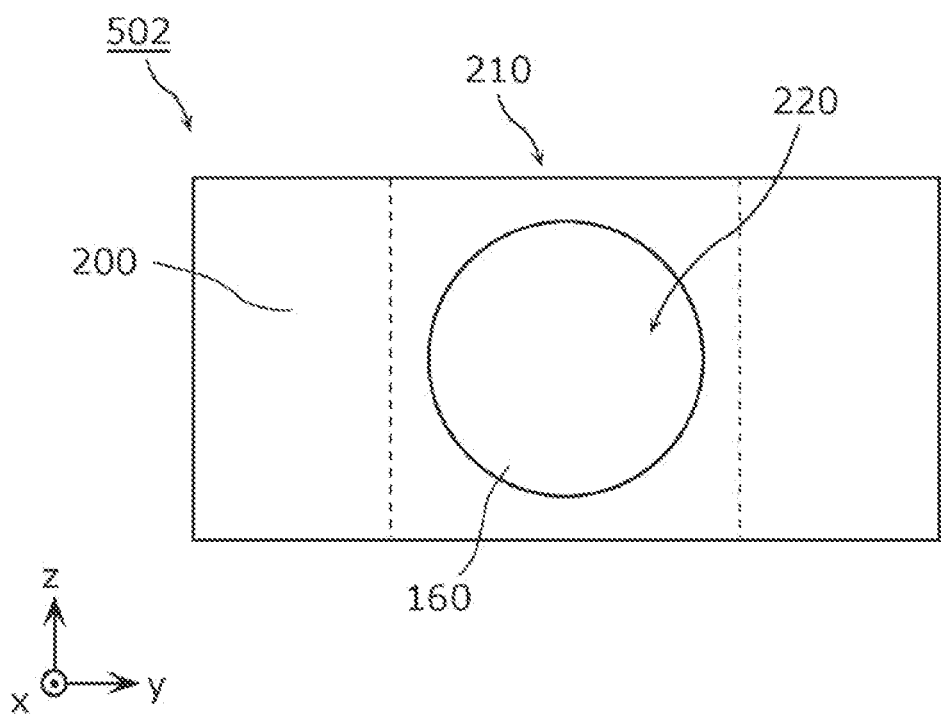
FIG. 4C is a side view illustrating the schematic configuration of the battery according to Embodiment 2.

FIG. 4A is a top view illustrating a schematic configuration of a battery 502 according to the present embodiment. FIG. 4B is a sectional view illustrating the schematic configuration of the battery 502 according to the present embodiment. FIG. 4B illustrates a cross section of the battery 502 at a position specified by a line IVB-IVB in FIG. 4A. FIG. 4C is a side view illustrating the schematic configuration of the battery 502 according to the present embodiment. FIG. 4C illustrates a side surface of the battery 502 when viewed from a reference electrode section 152 side of the battery 502 (that is, a positive x-axis direction side). As compared with the battery 500 according to Embodiment 1, the battery 502 includes the solid-state battery section 102 and the reference electrode section 152 in place of the solid-state battery section 100 and the reference electrode section 150. In addition, as compared with the battery 500 according to Embodiment 1, the battery 502 further includes an exterior 200 and a reference electrode current collector 160.

As illustrated in FIGS. 4A, 4B, and 4C, the battery 502 includes the solid-state battery section 102 including a power generating element 52, the reference electrode section 152, the reference electrode current collector 160, and the exterior 200 covering the power generating element 52 and the reference electrode section 152 and having a first cavity 210 and a second cavity 220. The battery 502 has a cylindrical shape.

The solid-state battery section 102 includes the power generating element 52, a positive electrode current collector 62, and a negative electrode current collector 72. The solid-state battery section 102 has a structure in which the negative electrode current collector 72, a negative electrode layer 22, a first solid electrolyte layer 32, a positive electrode layer 12, and the positive electrode current collector 62 are laminated in this order. The solid-state battery section 102 has a cylindrical shape. The solid-state battery section 102 may include multiple power generating elements 52 laminated with current collectors interposed in between.

The power generating element 52 includes the positive electrode layer 12, the negative electrode layer 22, and the first solid electrolyte layer 32 located between the positive electrode layer 12 and the negative electrode layer 22. The power generating element 52 is located inside the first cavity 210, and is in contact with an inner surface 210a of the exterior 200 forming the first cavity 210. Specifically, a portion of a side surface 52a of the power generating element 52 out of contact with a first main surface 132a is in contact with the inner surface 210a. The power generating element 52 has a cylindrical shape.

The reference electrode section 152 includes a second solid electrolyte layer 132 having the first main surface 132a in contact with the side surface 52a of the power generating element 52 and a second main surface 132b opposite to the first main surface 132a, and a reference electrode 112 in contact with the second main surface 132b. The reference electrode section 152 is located inside the second cavity 220, and is in contact with an inner surface 220a of the exterior 200 forming the second cavity 220. Specifically, a side surface of the reference electrode section 152 (in other words, the surface parallel with a laminating direction in the reference electrode section 152) is in contact with the inner surface 220a. The reference electrode section 152 has a cylindrical shape.

Since the power generating element 52 and the reference electrode section 152 are in contact with the inner surface 210a and the inner surface 220a, respectively, as described above, the power generating element 52 and the reference electrode section 152 are held by the exterior 200 even when expanding and contracting during charging and discharging. Further, since the power generating element 52 and the reference electrode section 152 are easily kept pressurized by the exterior 200, the measurement accuracy of an electrical characteristic of each of the electrodes in the battery 502 can be improved.

The positive electrode current collector 62 is located inside the first cavity 210. A side surface of the positive electrode current collector 62 is in contact with the inner surface 210a. An upper surface of the positive electrode current collector 62 is flush with an upper surface of the exterior 200. However, the upper surface of the positive electrode current collector 62 may be located inside the first cavity 210. Instead, the positive electrode current collector 62 may protrude from the upper surface of the exterior 200.

The negative electrode current collector 72 is located inside the first cavity 210. A side surface of the negative electrode current collector 72 is in contact with the inner surface 210a. A lower surface of the negative electrode current collector 72 is flush with a lower surface of the exterior 200. However, the lower surface of the negative electrode current collector 72 may be located inside the first cavity 210. Instead, the negative electrode current collector 72 may protrude from the lower surface of the exterior 200.

The reference electrode current collector 160 is located on a side of the reference electrode 112 opposite to the second solid electrolyte layer 132 side and is in contact with the reference electrode 112. Here, the position at which the reference electrode current collector 160 is in contact with the reference electrode 112 is not particularly limited, and the reference electrode current collector 160 may be in contact with any of the surfaces of the reference electrode 112 other than the surface in contact with the second solid electrolyte layer 132. The reference electrode current collector 160 is in contact with the entire surface on the side of the reference electrode 112 opposite to the second solid electrolyte layer 132 side, but instead may be in contact with a portion of the surface on the side of the reference electrode 112 opposite to the second solid electrolyte layer 132 side.

The reference electrode current collector 160 is located inside the second cavity 220. A surface on a side of the reference electrode current collector 160 opposite to the reference electrode 112 side is flush with an outer surface of the exterior 200. However, the surface on the side of the reference electrode current collector 160 opposite to the reference electrode 112 side may be located inside the second cavity 220. Instead, the reference electrode current collector 160 may protrude from the outer surface of the exterior 200.

A material for the reference electrode current collector 160 is a metal material having high conductivity, such as, for example, copper, aluminum, nickel, iron, stainless steel, platinum, gold, an alloy of two or more of these, or a plated product of any of these.

The shape of the reference electrode current collector 160 is not particularly limited and may be set depending on the shapes of the battery 502 and the exterior 200 and the like. The reference electrode current collector 160 has, for example, a rod shape, a plate shape, a sheet shape, a foil shape, a mesh shape, or the like.

The thickness of the reference electrode current collector 160 is, for example, greater than or equal to 1 μm and less than or equal to 10 mm. Instead, the thickness of the reference electrode current collector 160 may be greater than or equal to 10 mm depending on the shapes of the battery 502 and the exterior 200.

Each of the positive electrode layer 12, the negative electrode layer 22, the first solid electrolyte layer 32, the positive electrode current collector 62, the negative electrode current collector 72, the second solid electrolyte layer 132, the reference electrode 112, and the reference electrode current collector 160 has a circular shape in plan view, but the shape is not limited to that shape and may be a rectangular shape, a polygonal shape, or the like.

The battery 502 may further include a take-out terminal electrically connected to each of the positive electrode current collector 62, the negative electrode current collector 72, and the reference electrode current collector 160. A material for the take-out terminal may be any material having conductivity and materials generally used for batteries may be used. Examples of the material for the take-out terminal include copper, aluminum, stainless steel, and the like. The take-out terminal has a foil shape, a lead shape, or the like. Here, the positive electrode current collector 62, the negative electrode current collector 72, and the reference electrode current collector 160 may also work as the take-out terminals.

The exterior 200 is a battery exterior in which the power generating element 52 and the reference electrode section 152 are formed and which is for holding the power generating element 52 and the reference electrode section 152. The shape of the exterior 200 is not particularly limited and may be any shape capable of covering the power generating element 52 and the reference electrode section 152. In the example illustrated, the exterior 200 has a cylindrical shape having the cavities in which the power generating element 52 and the reference electrode section 152 are to be formed. The exterior 200 may have a cuboid shape, a polygonal columnar shape, or the like.

The exterior 200 has the first cavity 210 extending in a first direction and the second cavity 220 extending in a second direction crossing the first direction and communicating with the first cavity 210. In the example illustrated, the first direction is the laminating direction in the power generating element 52 (the z-axis direction) and the second direction is the direction normal to the side surface 52a of the power generating element 52 (the x-axis direction). In the present embodiment, the first direction and the second direction are orthogonal to each other. The first cavity 210 is a hole located at a center portion in the exterior 200 when viewed from the first direction and passing through the exterior 200. The second cavity 220 is a hole located at a center portion in the exterior 200 when viewed from the second direction and extending from the outer surface of the exterior 200 to the first cavity 210.

The side surface 52a of the power generating element 52 located inside the first cavity 210 and the first main surface 132a of the second solid electrolyte layer 132 in the reference electrode section 152 located inside the second cavity 220 are in contact with each other at an intersection of the first cavity 210 and the second cavity 220 where the first cavity 210 and the second cavity 220 communicate with each other. The first cavity 210 and the second cavity 220 have cylindrical shapes. The cylindrical shapes of the first cavity 210 and the second cavity 220 allows easy formation of the first cavity 210 and the second cavity 220. In addition, this structure is capable of uniformly dispersing a pressure applied for forming the power generating element 52 and the reference electrode section 152 and the stress due to expansion and contraction of the power generating element 52 and the reference electrode section 152 during charging and discharging, therefore making the exterior 200 less likely to be damaged even under a higher pressure or stress, and enabling measurement of an electrical characteristic of each electrode under conditions in wider ranges. Note that the shapes of the first cavity 210 and the second cavity 220 are not limited to the cylindrical shapes but may be cuboid shapes or polygonal columnar shapes. The first cavity 210 and the second cavity 220 may be tapered.

The inner surface 210a of the exterior 200 forming the first cavity 210 is in contact with the power generating element 52, the positive electrode current collector 62, and the negative electrode current collector 72. In short, the inner surface 210a is in contact with the solid-state battery section 102. The inner surface 220a of the exterior 200 forming the second cavity 220 is in contact with the reference electrode section 152 and the reference electrode current collector 160.

The positional relationship between and the shapes of the first cavity 210 and the second cavity 220 may be any positional relationship and shapes as long as the power generating element 52 and the reference electrode section 152 can be in electrochemical contact with each other. The positional relationship between and the shapes of the first cavity 210 and the second cavity 220 may be any positional relationship and shapes determined based on ease of processing and current extraction from the positive electrode layer 12, the negative electrode layer 22, and the reference electrode 112.

A material for the exterior 200 is not particularly limited and may be any material having insulating properties. Examples of the material for the exterior 200 include resin materials, such as epoxy resin, polycarbonate resin, polybutadiene resin, acrylic resin, polyamide resin, and polyacetal resin, ceramic, and the like. Among these, a resin material may be contained as a main component in a portion of the exterior 200 in contact with the power generating element 52 and the reference electrode section 152 from the viewpoints of workability, light weight, and cost.

Embodiment 4

Next, a battery according to Embodiment 4 will be described.

Embodiment 4 is different from Embodiment 3 mainly in that the exterior of the battery according to Embodiment 4 has a two-layer structure. In the following description, different points from Embodiments 1 to 3 will be mainly described, and the description of the common points will be omitted or simplified.

Figure 5A:
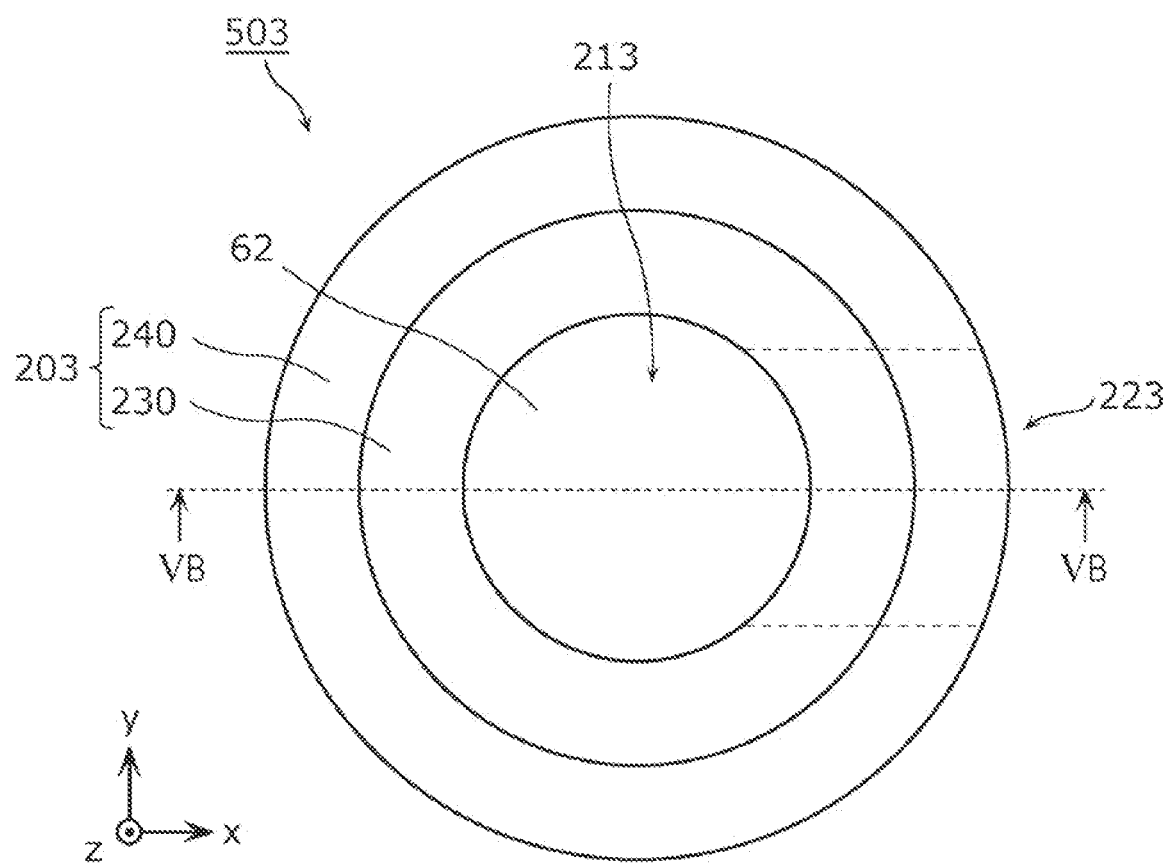
FIG. 5A is a top view illustrating a schematic configuration of a battery according to Embodiment 3.
Figure 5B:
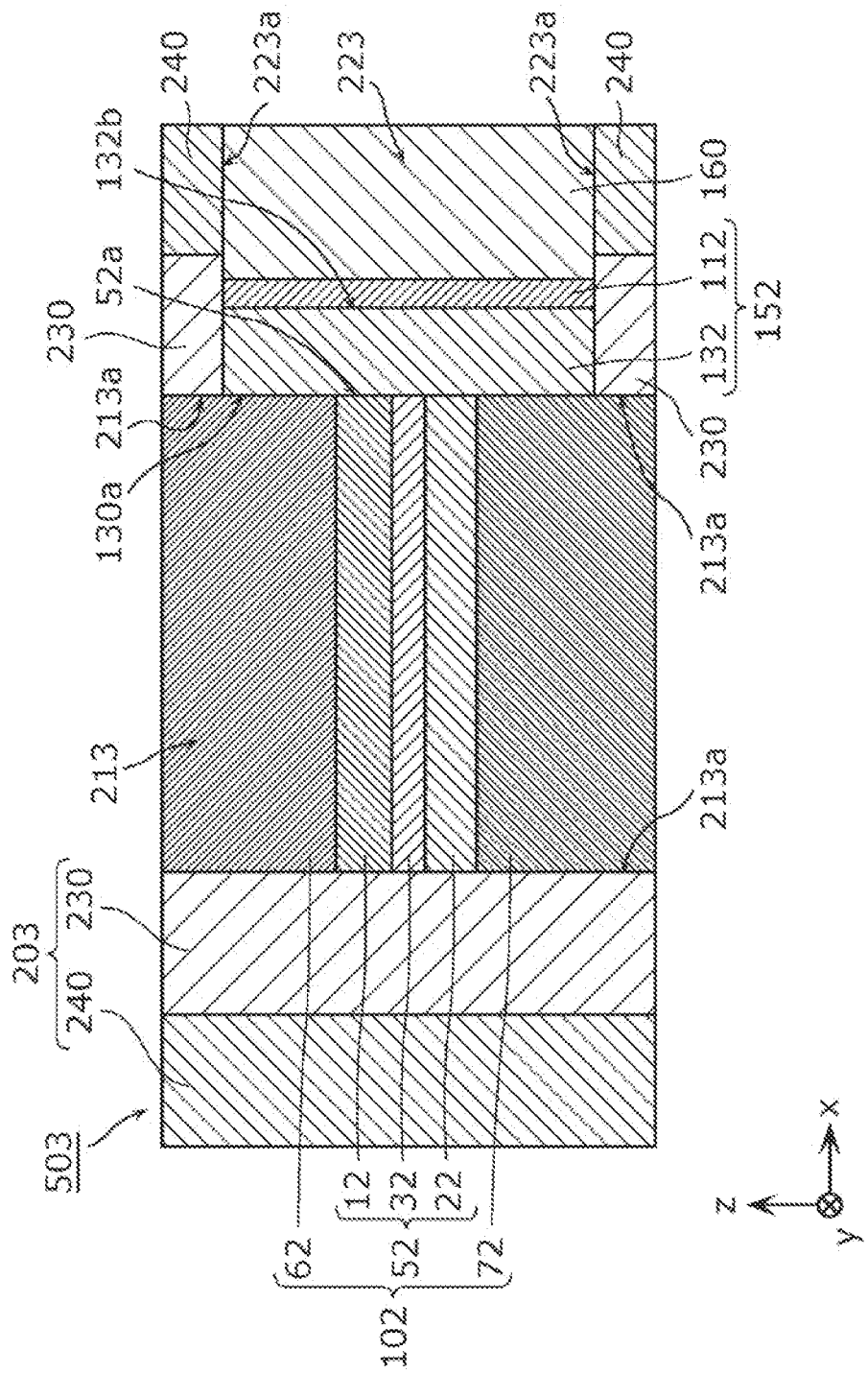
FIG. 5B is a sectional view illustrating the schematic configuration of the battery according to Embodiment 3.

FIG. 5A is a top view illustrating a schematic configuration of a battery 503 according to the present embodiment. FIG. 5B is a sectional view illustrating the schematic configuration of the battery 503 according to the present embodiment. FIG. 5B illustrates a cross section of the battery 503 at a position specified by a line VB-VB in FIG. 5A. As compared with the battery 502 according to Embodiment 3, the battery 503 includes an exterior 203 in place of the exterior 200. Since the exterior 200 and the exterior 203 have the same outer shapes, a side surface of the battery 503 has the same shape as in the battery 502 illustrated in FIG. 4C.

As illustrated in FIGS. 5A and 5B, the battery 503 includes a solid-state battery section 102 including a power generating element 52, a reference electrode section 152, a reference electrode current collector 160, and the exterior 203 covering the power generating element 52 and the reference electrode section 152 and having a first cavity 213 and a second cavity 223.

The exterior 203 has a first exterior section 230 and a second exterior section 240 located outside the first exterior section 230 when viewed from the first direction. Each of the first exterior section 230 and the second exterior section 240 has a cylindrical shape in which a cavity is formed.

The first cavity 213 is a hole located at a center portion in the first exterior section 230 when viewed from the first direction and passing through the first exterior section 230. The first cavity 213 is formed in the first exterior section 230. An inner surface 213a of the first exterior section 230 forming the first cavity 213 is in contact with the power generating element 52, a positive electrode current collector 62, and a negative electrode current collector 72. In short, the inner surface 213a is in contact with the solid-state battery section 102.

The second cavity 223 is a hole located at a center portion in the second exterior section 240 (exterior 203) when viewed from the second direction and extending from an outer surface of the second exterior section 240 through the first exterior section 230 to the first cavity 213. In an inner surface 223a of the exterior 203 forming the second cavity 223, the inner surface of the first exterior section 230 is in contact with the reference electrode section 152. In the inner surface 223a of the exterior 203 forming the second cavity 223, the inner surface of the second exterior section 240 is out of contact with the reference electrode section 152. However, the inner surface of the second exterior section 240 may be in contact with the reference electrode section 152.

The first exterior section 230 is in contact with the power generating element 52 and the reference electrode section 152. Specifically, the first exterior section 230 is in contact with both of the side surfaces of the power generating element 52 and the reference electrode section 152. The first exterior section 230 is a portion of the exterior 203 in contact with the power generating element 52 and the reference electrode section 152. When viewed from the first direction, the outer surface of the first exterior section 230 is entirely covered with the second exterior section 240 and is contact with the second exterior section 240. However, when viewed from the first direction, a portion of the outer surface of the first exterior section 230 may not be covered with the second exterior section 240.

As a material for the first exterior section 230, the foregoing materials for the exterior 200 may be used. The first exterior section 230 may contain a resin material as a main component.

The second exterior section 240 is in contact with the reference electrode current collector 160. Then, the second exterior section 240 is out of contact with the power generating element 52 and the reference electrode section 152. However, the second exterior section 240 may be out of contact with the reference electrode current collector 160. For example, another member may be inserted between the reference electrode current collector 160 and the second exterior section 240. Instead, the second exterior section 240 may be in contact with the reference electrode section 152.

When viewed from the first direction, an inner surface of the second exterior section 240 is in contact with the first exterior section 230. The second exterior section 240 is a cylinder having a cylindrical cavity for storing the first exterior section 230 at a center portion when viewed from the first direction. The strength of the second exterior section 240 is higher than the strength of the first exterior section 230. Thus, even when a high pressure is applied to the power generating element 52, deformation and damage of the first exterior section 230 are suppressed since the first exterior section 230 is covered with the second exterior section 240 having the higher strength and therefore the power generating element 52 can be formed appropriately. In addition, the power generating element 52 can be kept pressurized even at a higher pressure. This makes it possible to stably measure an electrical characteristic of each of the electrodes in the battery 503. Moreover, as compared with the structure in which the exterior only includes the first exterior section 230, the structure in which the exterior 203 includes the second exterior section 240 allows the exterior to be formed with the same degree of strength even if a portion covering the power generating element 52 is thin, and thereby enables size reduction. Here, the second exterior section 240 may cover the outer side of the first exterior section 230 when viewed from the second direction. In this case, a higher pressure can be applied to the reference electrode section 152.

A material for the second exterior section 240 may be a material having a higher strength than that of the first exterior section 230. Examples of the material for the second exterior section 240 include metal materials including metals, such as iron, copper, nickel, and aluminum, alloys of combinations of these, alloys each mainly containing any of them, and the like, high strength resins, such as engineering plastics and resin composite materials reinforced with carbon fibers or the like. The second exterior section 240 may contain a metal material as a main component from the viewpoint of strength and workability. For the second exterior section 240, a stainless steel may be used from the viewpoint of corrosion resistance.

Example

Hereinafter, Example in the present disclosure will be described. This Example is only for illustrative purposes and is not intended to limit the present disclosure.

First, glass electrolyte powder of a sulfide solid electrolyte $Li_2S$—$P_2S_5$ ($Li_2S:P_2S_5$=70:30 (mole ratio)) was prepared as a raw material for the solid electrolyte. The powder obtained by annealing treatment of the above glass electrolyte powder at 200° C. was used as the solid electrolyte. The power thus obtained contained triclinic crystals as a main component, had a wide crystalline distribution from crystalline to amorphous, and had an average particle size of 5 μm.

Next, $LiNi_{0.85}Co_{0.15}Al_{0.05}O_2$ powder as the positive electrode active material and the solid electrolyte weighed to a volume ratio of 1:1 were mixed to obtain the positive electrode mixture.

Then, natural graphite powder as the negative electrode active material and the solid electrolyte weighed to a volume ratio of 1:1 were mixed to obtain the negative electrode mixture.

Subsequently, the exterior including the first exterior section made of an acrylic resin and the second exterior section made of a stainless steel was prepared such that the first exterior section had a cylindrical shape with a diameter of 20 mm and a height of 20 mm and had a first cavity with a diameter of 9.5 mm formed at the center thereof, the second exterior section had a cylindrical shape with a diameter of 30 mm and a height of 20 mm and had a cavity for storing the first exterior section with the diameter of 20 mm at the center thereof, and a second cavity with a diameter of 3 mm communicating with the first cavity was formed at a center portion of a side surface of the exterior. Then, 30 mg of the solid electrolyte was put in the second cavity and pressurized to form the second solid electrolyte layer, and thereafter the reference electrode section was produced by placing metallic lithium as the reference electrode in contact with the second solid electrolyte layer. Meanwhile, 80 mg of the solid electrolyte was put in the first cavity and pressurized at 100 MPa to form the first solid electrolyte layer, and thereafter 16.7 mg of the positive electrode mixture was put on one of the surface sides of the first solid electrolyte layer and pressurized at 100 MPa to obtain the positive electrode layer. Subsequently, 15.4 mg of the negative electrode mixture was put on the side of the first solid electrolyte layer opposite to the positive electrode layer side and pressurized at 600 MPa to form the negative electrode layer, so that the power generating element was produced. The power generating element was formed such that the side surface of the power generating element was in contact with the second solid electrolyte layer. In this way, the battery including the power generating element and the reference electrode section was obtained. Here, a jig for pressurization was used to pressurize each of the layers.

Next, the positive electrode current collector and the negative electrode current collector were formed by inserting stainless steel rods in a cylindrical shape with a diameter of 9.5 mm into the first cavity from the upper and lower directions. Meanwhile, the reference electrode current collector was formed by inserting a stainless steel rod with a diameter of 3 mm into the second cavity.

Next, the battery in Example was obtained which was kept pressurized at a pressure of 150 MPa by pressurization with bolts from the upper and lower directions of the stainless steel rods serving as the positive electrode current collector and the negative electrode current collector. In the following description, the positive electrode layer and the positive electrode current collector will be collectively referred to as the positive electrode, the negative electrode layer and the negative electrode current collector will be collectively referred to as the negative electrode, and the reference electrode and the reference electrode current collector will be collectively referred to as the reference electrode.

Figure 6:
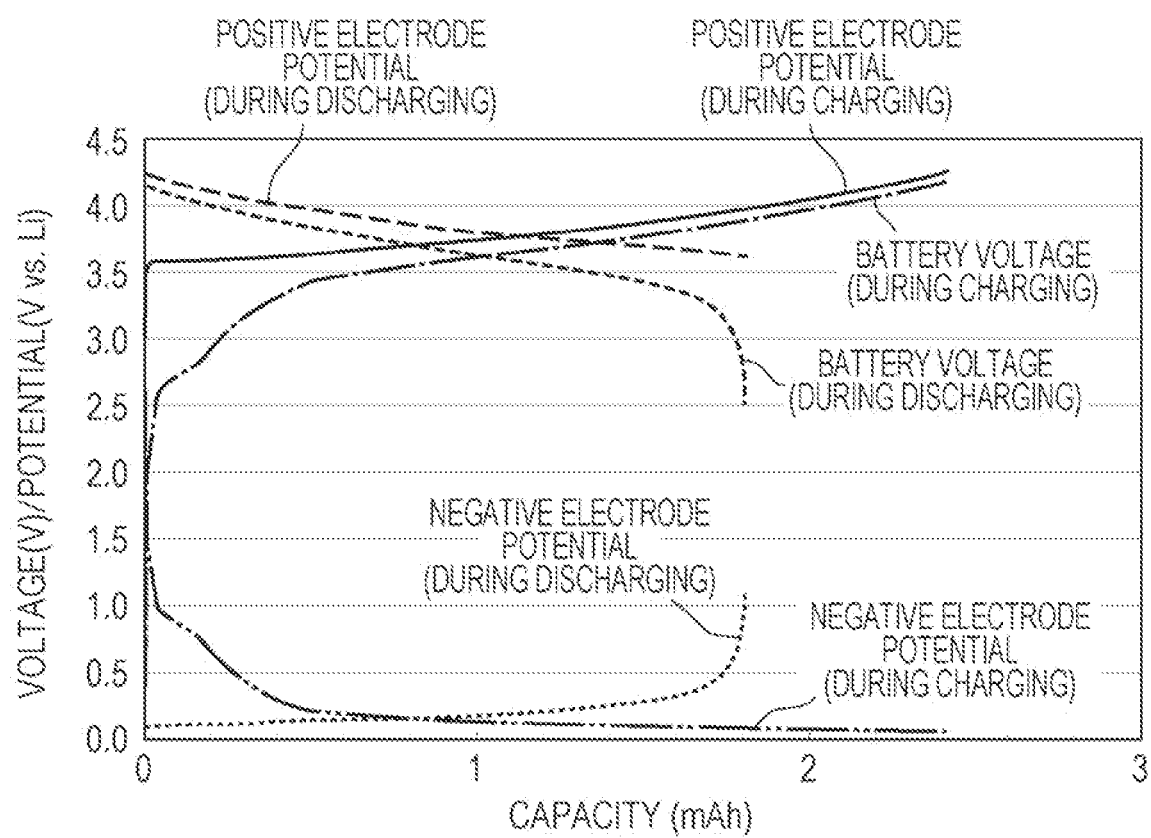
FIG. 6 is a diagram presenting results of voltage measurements in a battery in Example when being charged and discharged.

In the battery for evaluation thus obtained, voltage meters were connected between the positive electrode and the negative electrode, between the positive electrode and the reference electrode, and between the negative electrode and the reference electrode, and then a current of 120 µA was applied between the positive electrode and the negative electrode to charge the battery to 4.2 V. Thereafter, the battery was discharged to 2.5 V with the same current value. FIG. 6 is a diagram presenting results of voltage measurements of the battery in Example when being charged and discharged.

As illustrated in FIG. 6, in the battery in Example, the battery voltage, which is a voltage between the positive electrode and the negative electrode, rose during charging and dropped during discharging, which confirms that the battery was able to be charged and discharged. In addition, the positive electrode potential (vs. Li) and the negative electrode potential (vs. Li) demonstrated the behaviors corresponding to the battery voltage during the charging and discharging, which confirms that each of the positive electrode potential and the negative electrode potential was able to be measured concurrently together with the battery voltage.

Other Embodiments

Although the battery, the exterior, and the method for measuring an electrical characteristic of a battery according to the present disclosure have been described heretofore based on the embodiments, the present disclosure should not be limited to these embodiments. The scope of the present disclosure includes various modifications of the embodiments conceivable by those skilled in the art and other modes constructed by combining some of the constituent elements in the embodiments, without departing from the gist of the present disclosure.

In the foregoing embodiments, the power generating element includes the positive electrode layer and the negative electrode layer, but is not limited to this structure. For example, in the case where the battery is used to grasp an electrical characteristic of an electrode, the power generating element may have a second positive electrode layer in place of the negative electrode layer. In this case, an electrical characteristic of each of the positive electrode layers can be measured alone. In addition, the power generating element may include a second negative electrode layer in place of the positive electrode layer.

Further, in the foregoing embodiments, various changes, replacements, additions, omissions, or the like can be made within the scope of claims or the scope of the equivalents thereof.

According to the present disclosure, it is possible to obtain a battery in which a potential of a positive electrode and/or a negative electrode can be easily measured. In addition, it is also possible to obtain an exterior that enables easy formation of a battery and is capable of holding the battery.

What is claimed is:

1. A battery comprising:
   a power generating element including a first electrode layer, a second electrode layer, and a first solid electrolyte layer located between the first electrode layer and the second electrode layer; and
   a reference electrode section including a second solid electrolyte layer having a first main surface in contact with a side surface of the power generating element and a second main surface opposite to the first main surface, and a reference electrode in contact with the second main surface of the second solid electrolyte layer, wherein
   a length of the first main surface is longer than a length of the side surface in a laminating direction in the power generating element.

2. The battery according to claim 1, wherein
   the first solid electrolyte layer and the second solid electrolyte layer have lithium-ion conductivity.

3. The battery according to claim 1, wherein
   the reference electrode contains at least one of metallic lithium, a lithium alloy, or a lithium compound.

4. The battery according to claim 1, comprising a plurality of power generating elements laminated, each of which being the power generating element included in the battery.

5. The battery according to claim 4, wherein
   the first main surface is in contact with the plurality of power generating elements.

6. The battery according to claim 1, further comprising an exterior covering the power generating element and the reference electrode section.

7. The battery according to claim 6, wherein
   the exterior has a first cavity extending in a first direction and a second cavity extending in a second direction crossing the first direction and communicating with the first cavity,
   the power generating element is in contact with an inner surface of the exterior forming the first cavity, and
   the reference electrode section is in contact with an inner surface of the exterior forming the second cavity.

8. The battery according to claim 7, wherein
   at least one of the first cavity or the second cavity has a cylindrical shape.

9. The battery according to claim 7, wherein
   a portion of the exterior in contact with the power generating element and the reference electrode section contains a resin material.

10. A battery, comprising:
    a power generating element including a first electrode layer, a second electrode layer, and a first solid electrolyte layer located between the first electrode layer and the second electrode layer;

a reference electrode section including a second solid electrolyte layer having a first main surface in contact with a side surface of the power generating element and a second main surface opposite to the first main surface, and a reference electrode in contact with the second main surface of the second solid electrolyte layer; and an exterior covering the power generating element and the reference electrode section, wherein a first length of the first main surface is longer than a second length of the side surface in a laminating direction in the power generating element, the exterior includes a first cavity extending in a first direction and a second cavity extending in a second direction crossing the first direction and communicating with the first cavity, the power generating element is in contact with first inner surfaces of the exterior forming the first cavity, the reference electrode section is in contact with second inner surfaces of the exterior forming the second cavity, the exterior further includes a first exterior section in contact with the power generating element and the reference electrode section and a second exterior section located outside the first exterior section, and a first strength of the second exterior section is higher than a second strength of the first exterior section.

11. The battery according to claim 10, wherein the second exterior section contains a metal material.

12. The battery according to claim 1, further comprising a current line between the reference electrode and at least one of the first electrode layer or the second electrode layer.

13. A battery exterior which is the exterior according to claim 6.

14. A method for measuring an electrical characteristic of a battery, the battery including a power generating element including a first electrode layer, a second electrode layer, and a first solid electrolyte layer located between the first electrode layer and the second electrode layer, the method comprising:

preparing a reference electrode section including a second solid electrolyte layer including a first main surface configured to be in contact with a side surface of the power generating element in a laminating direction of the power generating element and a second main surface opposite to the first main surface, and a reference electrode in contact with the second main surface of the second solid electrolyte layer;

bringing the first main surface of the second solid electrolyte layer into contact with the side surface of the power generating element; and measuring an electrical characteristic between the reference electrode and at least one of the first electrode layer or the second electrode layer, wherein a first length of the first main surface is longer than a second length of the side surface in the laminating direction of the power generating element.

* * * * *